Feb. 25, 1936.   R. P. JACKSON ET AL   2,032,129
CAPACITOR MOTOR
Filed Nov. 11, 1933
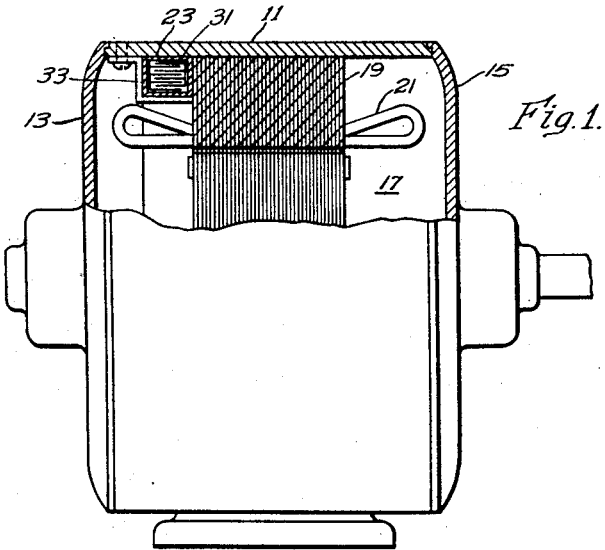
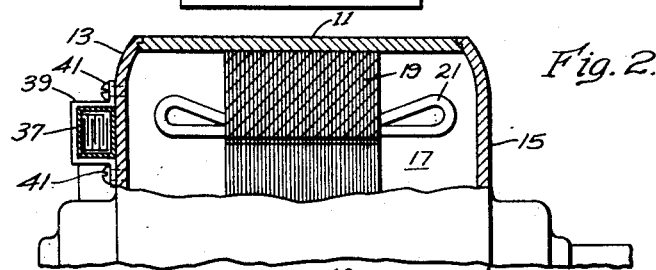
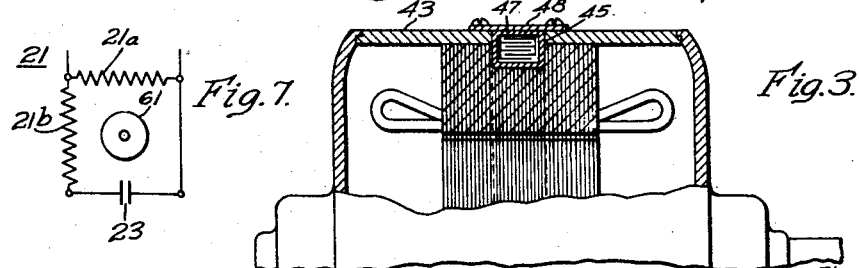
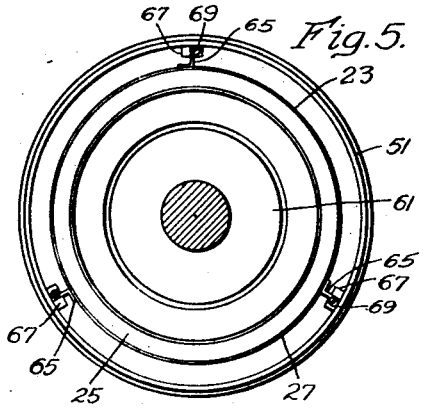
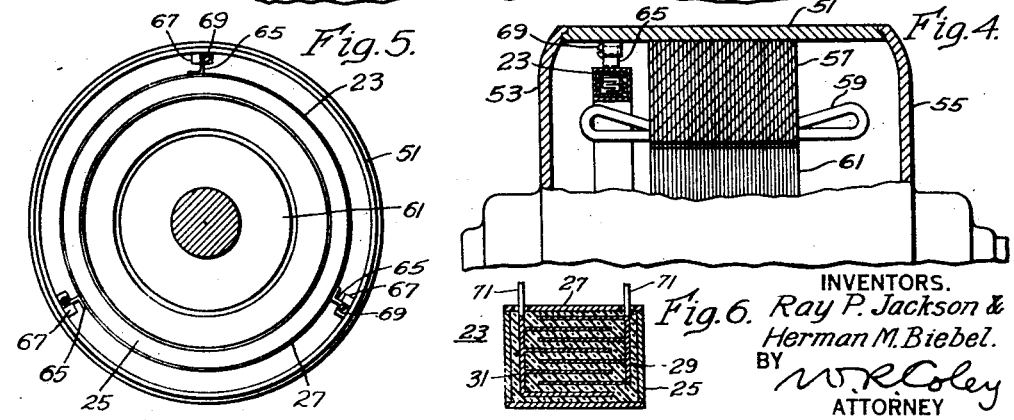
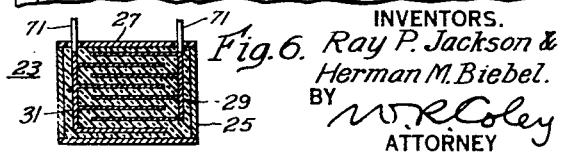
INVENTORS.
Ray P. Jackson &
Herman M. Biebel.
BY W. R. Coley
ATTORNEY Patented Feb. 25, 1936

2,032,129

UNITED STATES PATENT OFFICE 2,032,129

CAPACITOR MOTOR

Ray P. Jackson, Wilkinsburg, and Herman M. Biebel, Oakmont, Pa., assignors to Westinghouse Electric & Manufacturing Company, East Pittsburgh, Pa., a corporation of Pennsylvania Application November 11, 1933, Serial No. 697,590

6 Claims. (Cl. 172—233)

Our invention relates to electric motors and more particularly to capacitor motors.

An object of our invention is to provide a relatively simple and inexpensive location of, and mounting for, a capacitor in operative association with an electric motor.

Another object of our invention is to provide a relatively simple and easily mountable and demountable condenser for use in an electric motor.

Other objects of our invention will either be apparent from the description of one form of device embodying our invention or will be specifically pointed out hereinafter.

In practicing our invention we provide an annular condenser which is adapted to be operatively associated with a motor and to be located therein or thereon substantially co-axially with the rotor axis.

In the drawing:

Figure 1 is a view partly in elevation and partly in longitudinal section, through an electric motor with which is associated the device particularly embodying our invention;

Fig. 2 is a view similar to that of Fig. 1 showing a different location of the condenser;

Fig. 3 is a view similar to that of Figs. 1 and 2 and showing a still further location of the condenser in a motor assembly;

Fig. 4 is another view showing a still further location of the condenser, the location and mounting being of the kind now preferred by us;

Fig. 5 is a view in end elevation showing particularly the mounting of an annular condenser;

Fig. 6 is a view in lateral section through the condenser of Fig. 5; and

Fig. 7 is a diagram showing the electrical connections of the condenser.

Capacitor motors are finding increased use in the small motor field, but, so far as we are aware, the structures heretofore used have been rather cumbersome as well as unbalanced and unsightly. Condensers of substantially rectangular box form have been used in many cases and have been mounted either at one end of a motor assembly, e. g., on one of the bearing brackets, or a rectangular box, enclosing not only the condenser but also an auto-transformer used therewith, have been mounted on top of the motor. Composite structures of this kind not only look unsightly but also require a much larger amount of space than is required by the motor proper, and if, as may occur in some types of motors, there is a tendency to unbalance or vary the torque, such as occurs in single-phase alternating-current motors, the assembly is not balanced relatively to the axis of the shaft and may result in unbalanced vibratory conditions with an attendant excessive amount of noise.

Referring first to Fig. 1 of the drawing, we have there illustrated a motor embodying a stator housing 11, bearing brackets 13 and 15 associated therewith, and a rotor structure designated in its entirety by the numeral 17. A stator 19 and a stator winding 21 are associated with the housing 11 in the usual manner, the winding 21 actually comprising two windings, a main winding 21a and an auxiliary or capacitor winding 21b (see Fig. 7). While we have illustrated a specific and particular design and assembly, our invention is not limited to these particular details which are, therefore, shown for illustrative purposes and are not to be taken in a limiting sense.

An annular condenser 23, which may be of the type shown in detail in Figs. 5 and 6 of the drawing, includes an annular metal casing 25 of substantially channel shape in lateral section and a cover 27 thereon within which is located insulating material 29 and the usual condenser structure 31 including two layers of conducting material separated by a layer of electric insulating material. It is, of course, within the province of our invention to use other forms or types of condenser so long as the condenser is of annular shape.

In order to hold the condenser in proper operative position within the motor assembly, we may provide a plurality of peripherally spaced clamping lugs 33, each of substantially Z-shape, for example, one end portion of which may be secured against the housing 11, as is shown in Fig. 1 of the drawing.

Referring now to Fig. 2 of the drawing, we have there illustrated a substantially similar motor structure embodying a housing 11, bearing brackets 13 and 15, and an annular condenser 37 which may be of the same type and construction as hereinbefore described, and which is mounted against the outside of bearing bracket 13 by a plurality of clamping members 39, each of substantially U-shape and secured against the bearing bracket 13 by a plurality of machine screws 41.

Referring to Fig. 3 of the drawing, we have there illustrated a different form of assembly including a different type of motor housing 43, the bearing brackets cooperating therewith being either the same as shown in Figs. 1 and 2 or changed to insure proper cooperation therewith the housing 43.

It frequently happens that it is found desirable to provide an intermediate annular space within the housing of a motor of this kind, and we have taken advantage of the provision of an annular chamber 45 within the housing 43 and the laminations to locate therein an annular condenser 47. This condenser may be of substantially the same design as described in connection with Fig. 6 of the drawing. It is to be understood that the other parts of the motor assembly are of similar type and design as those described above for Figs. 1 and 2 of the drawing. Clamping strips 48 may be provided to assist in holding the housing parts in proper operative position as well as to hold the capacitor.

Referring to Figs. 4 and 5 of the drawing, we have there illustrated a form of the invention now preferred by us and including a housing 51, bearing brackets 53 and 55, as well as a set of stator laminations 57 and a stator winding 59, together with a rotor 61.

An annular condenser 23 is yieldingly held coaxially with the rotor shaft by means of a plurality, preferably three, leaf springs 65, one end of which is suitably rigidly secured to a part of the casing 25 of the condenser, while the other or outer end thereof is rigidly secured to the housing as in internally slotted or recessed lugs 67.

We have shown these lugs as provided with recesses of the proper radial depth so that the three leaf springs 65 may easily be slid into the slots in lugs 67 and against a rear wall portion thereof and then held in place, as by means of clamping screws 69, whereby we provide a relatively simple means for resiliently supporting the annular condenser, which mounting means permits of easily and quickly assembling and disassembling the condenser.

We have indicated the connections between the condenser and the stator winding generally only by leads designated by numeral 71, and it is to be understood that suitable connections are made between the condenser and the particular energizing winding with which the condenser is operatively associated and to which it is electrically connected. Fig. 7 shows a diagram of connections of a capacitor motor using our invention, the main winding being indicated by 21a and the auxiliary or capacitor winding by 21b, the latter having the capacitor 23 connected in series circuit therewith.

We may point out that the device embodying our invention provides a relatively simple means for mounting a condenser in operative association with an electric motor in such a manner that a sightly, symmetrical and balanced assembly is obtained and in which the condenser may easily and quickly be mounted in its proper operative position and may be easily and quickly disassembled therefrom.

We may point out another effect which we can obtain by the use of a resiliently mounted annular condenser concentric with the axis of the rotor and of the stator, namely, that the resiliently mounted condenser will have a damping action upon the stator in case the same is subjected to torsional or peripheral oscillations or movements, as occur frequently in motors, in which one of two phases is not as effective in producing torque as is the other phase. The annular condenser, when supported by the resilient members 65, can oscillate tangentially of the shaft axis through a small distance, so that the above described damping action will result.

Various modifications may be made in the device embodying our invention without departing from the spirit and scope thereof, and we desire, therefore, that only such limitations shall be placed thereon as are imposed by the prior art or are set forth in the appended claims.

We claim as our invention:

1. In a capacitor motor including a housing, a stator structure and a rotor structure therein, an annular condenser structure within the housing substantially coaxial with the stator and rotor, and a plurality of substantially radially-extending leaf springs having their respective ends operatively engaging the housing and the condenser structure.

2. In a capacitor motor assembly including a housing, a stator and a rotor therein, an annular condenser structure within the housing, and spring means operatively connecting the housing and the condenser structure to hold the latter substantially coaxial with the stator and rotor while leaving the condenser structure free to move tangentially relatively to the housing through short distances.

3. In a capacitor motor including a housing structure, a stator assembly and a rotor assembly therein, an annular condenser and resilient mounting means for the condenser to support it on the housing structure substantially coaxial with the stator and rotor, said condenser being restrained with respect to axial movement and free to oscillate tangentially.

4. In a capacitor motor assembly including a stator housing having a plurality of spaced slotted lugs therein, an annular condenser structure within the housing, a plurality of springs each having one end secured to the condenser structure and having the other end thereof extending into a slotted lug to hold the condenser structure substantially coaxial with the stator housing.

5. In a capacitor motor assembly including a stator housing having a plurality of spaced radially slotted lugs therein, an annular condenser structure within the housing, a plurality of leaf springs, each having one end operatively secured to the condenser structure while the other end extends into a slotted lug to resiliently support the condenser structure substantially coaxial with the stator housing, said condenser structure and springs being movable into proper operative position axially of the stator housing.

6. A device as set forth in claim 5 and including means engaging the slotted lugs to hold the leaf springs in the slotted lugs.

RAY P. JACKSON.
HERMAN M. BIEBEL.